US008068816B2

(12) United States Patent
Vander Veen

(10) Patent No.: US 8,068,816 B2
(45) Date of Patent: Nov. 29, 2011

(54) VOICE MAILBOX CONFIGURATION METHODS AND APPARATUS FOR MOBILE COMMUNICATION DEVICES

(75) Inventor: Raymond P. Vander Veen, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/850,047

(22) Filed: Aug. 4, 2010

(65) Prior Publication Data

US 2010/0297984 A1 Nov. 25, 2010

Related U.S. Application Data

(63) Continuation of application No. 10/703,644, filed on Nov. 7, 2003, now Pat. No. 7,796,977.

(60) Provisional application No. 60/426,872, filed on Nov. 18, 2002.

(51) Int. Cl.
*H04M 11/10* (2006.01)
*H04M 3/00* (2006.01)

(52) U.S. Cl. ......... 455/413; 455/418; 455/419; 455/420

(58) Field of Classification Search .................... 455/413
See application file for complete search history.

(56) References Cited

U.S. PATENT DOCUMENTS

| 6,333,973 | B1 | 12/2001 | Smith et al. |
| 6,816,577 | B2 * | 11/2004 | Logan ........................... 379/67.1 |
| 2002/0078143 | A1 | 6/2002 | De Boor et al. |
| 2002/0183044 | A1 | 12/2002 | Blackwell et al. |
| 2003/0040340 | A1 | 2/2003 | Smethers |
| 2003/0228863 | A1 | 12/2003 | Vander Veen et al. |
| 2004/0023643 | A1 | 2/2004 | Vander Veen et al. |
| 2005/0111631 | A1 | 5/2005 | Jordan |
| 2008/0261564 | A1 * | 10/2008 | Logan ........................... 455/413 |

FOREIGN PATENT DOCUMENTS

| EP | 0651544 A2 | 5/1995 |
| EP | 1091549 A2 | 4/2001 |

OTHER PUBLICATIONS

Canadian office Action for CA application 2,506,383, Aug. 21, 2008.
PCT Search Report for Application PCT/CA03/01734, Nov. 12, 2003.

(Continued)

*Primary Examiner* — Patrick N. Edouard
*Assistant Examiner* — Huy Ho
(74) *Attorney, Agent, or Firm* — John J. Oskorep, Esq.

(57) ABSTRACT

In one illustrative example disclosed, a mobile communication device includes a user interface, a processor, and a wireless transmitter. The user interface includes, among other things, a visual display which is part of a graphical user interface (GUI). For configuring a voice mailbox at a remote voicemail system, the GUI visually displays a user input prompt for voice mailbox configuration information which corresponds to an audible user input prompt provided by the voicemail system. The user input prompt may be, for example, a prompt for a user password, an audible voicemail greeting, or an audible user name for the voice mailbox. Through the user interface, the voice mailbox configuration information is received by the processor in response to the user input prompt and transmitted to the voicemail system by the wireless transmitter. Advantageously, the mobile device provides a consistent user-friendly GUI for voice mailbox configuration as well as for its primary applications.

20 Claims, 10 Drawing Sheets

OTHER PUBLICATIONS

EP Examination Report for EP Application 03775011.4, Apr. 28, 2008.
Response to Written Communication for EP application 03775011.4, Oct. 6, 2008.
European Patent Office, Article 96 (2) Communication, Jun. 11, 2007.
International Preliminary Examination Report for PCT application PCT/CA03/01734, Feb. 11, 2005.

* cited by examiner

VOICE MAILBOX CONFIGURATION METHODS AND APPARATUS FOR MOBILE COMMUNICATION DEVICES

CROSS-REFERENCE TO RELATED APPLICATIONS

The present application is a continuation of and claims priority to U.S. non-provisional patent application having application Ser. No. 10/703,644 and filing date of 7 Nov. 2003, now U.S. Pat. No. 7,796,977, which claims priority to U.S. provisional patent application having application No. 60/426,872 and filing date of 18 Nov. 2002, each application being hereby incorporated by reference herein.

BACKGROUND

1. Field of the Invention

The present invention relates generally to mobile communication devices and their operation with remote voicemail systems, and more particularly to methods and apparatus for remotely configuring voice mailboxes of voicemail systems from mobile communication devices.

2. Description of the Related Art

"Voicemail" is a common feature for practically all voice-based communication products. As examples, home telephone systems now offer voicemail features built right into telephones, telephone companies offer voicemail services in their phone networks, corporations provide voicemail for every desk with integration with e-mail, and wireless carriers offer voicemail packages in connection with their cellular telephones. The average professional may have two or three different voicemail systems that must be checked for new voicemail messages from the home, the office, or cellular telephone. Each voicemail system typically has a different password access and different command codes for the same voicemail functions (e.g. PLAY, REWIND, SAVE, and DELETE). The result of the above is that the end user must check several different voicemail systems for voicemail while away and remember each set of voicemail command codes. It would be advantageous to simplify the interaction with respect to one or more voicemail systems.

Mobile communication devices, such as cellular telephones or mobile e-mail devices, are also becoming increasingly ubiquitous. Many present-day mobile devices provide easy-to-use user interfaces for the input and output of user information. For example, a mobile device may provide an interactive graphical user interface (GUI) for several primary applications of the mobile device (e.g. e-mail or Internet applications). Conventionally, however, this GUI is not associated with the configuration of a voice mailbox of a voicemail system. Voice mailbox configuration information typically includes a user password, an audible greeting, and an audible user name. A voicemail system typically requires the user to call the voicemail system and actuate Dual Tone Multiple Frequency (DTMF) keys of the telephone device (i.e. voicemail system specific commands) to enter password information and speak into a microphone to record a user greeting and name. It would be further advantageous to simplify the user interface of the mobile device for consistency and ease-of-use for voice mailbox configuration.

SUMMARY

In one illustrative embodiment of the present application, a mobile communication device includes a user interface, a processor, and a wireless transmitter. The user interface includes, among other things, a visual display which is part of a graphical user interface (GUI). For configuring a voice mailbox at a remote voicemail system, the GUI visually displays a user input prompt for voice mailbox configuration information which corresponds to an audible user input prompt provided by the voicemail system. The user input prompt may be for a user password, an audible voicemail greeting, or an audible user name for the voice mailbox, as examples. The voice mailbox configuration information is received by the processor through the user interface in response to the user input prompt and transmitted to the voicemail system by the wireless transmitter for storage. Advantageously, the mobile device provides a consistent user-friendly GUI for voice mailbox configuration as well as for its primary applications.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

In one illustrative example of the present application, a mobile communication device includes a user interface, a processor, and a wireless transmitter. The user interface includes, among other things, a visual display which is part of a graphical user interface (GUI). For configuring a voice mailbox at a remote voicemail system, the GUI visually displays a user input prompt for voice mailbox configuration information which corresponds to an audible user input prompt provided by the voicemail system. The user input prompt may be for a user password, an audible voicemail greeting, or an audible user name for the voice mailbox, as examples. The voice mailbox configuration information is received by the processor through the user interface in response to the user input prompt and transmitted to the voicemail system by the wireless transmitter for storage. Advantageously, the mobile device provides a consistent user-friendly GUI for voice mailbox configuration as well as for its primary application(s).

Figure 1:
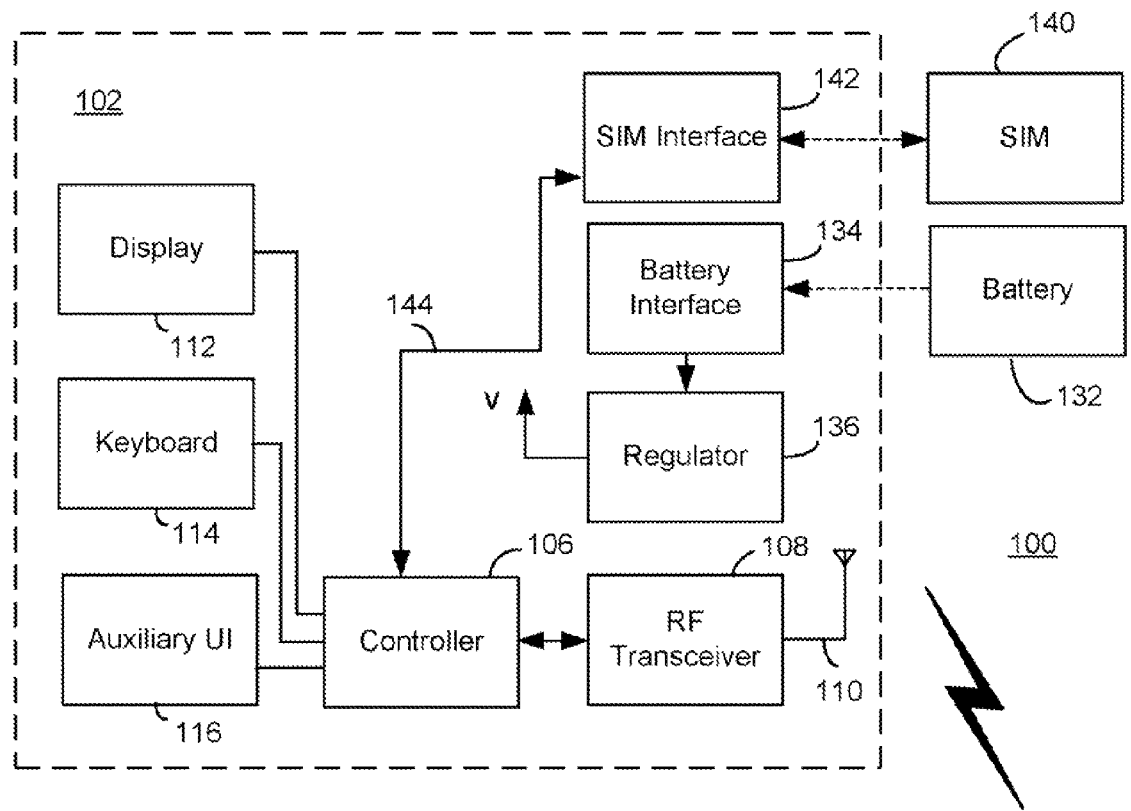
FIG. 1 is a block diagram which illustrates pertinent components of a mobile communication device which communicates within a wireless communication network.
Figure 1:
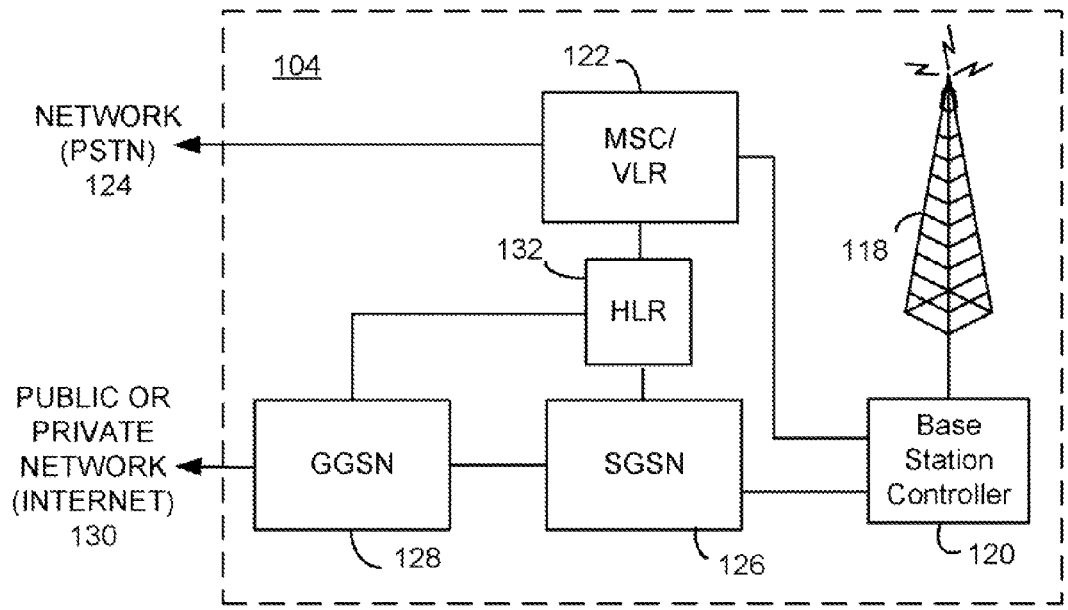

FIG. 1 is a block diagram of a communication system 100 which includes a mobile station 102 which communicates through a wireless communication network 104. In the embodiment of FIG. 1, wireless network 104 is configured in accordance with General Packet Radio Service (GPRS) and Global Systems for Mobile (GSM) technologies; however, any suitable type of network communication protocols may be utilized. For example, the network may be based on code division multiple access (CDMA) or other suitable technologies. As another example, the network may be based on an Integrated Dispatch Enhanced Network (iDEN) which is a high-capacity digital trunked radio system providing integrated voice and data services.

Mobile station 102, which is one type of mobile communication device, preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and base station controller 120, including for example modulation/demodulation and possibly encoding/decoding and encryption/decryption. It is also contemplated that RF transceiver circuitry 108 may perform certain functions in addition to those performed by base station controller 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 132 provides for a mechanical and electrical connection for battery 132. Battery interface 132 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any of their subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 402 of FIG. 2.

Mobile station 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile stations within its cell via station 118. The fixed transceiver equipment normally performs such functions as modulation and possibly encoding and/or encryption of signals to be transmitted to the mobile station in accordance with particular, usually predetermined, communication protocols and parameters, under control of its controller. The fixed transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the fixed transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Figure 2:
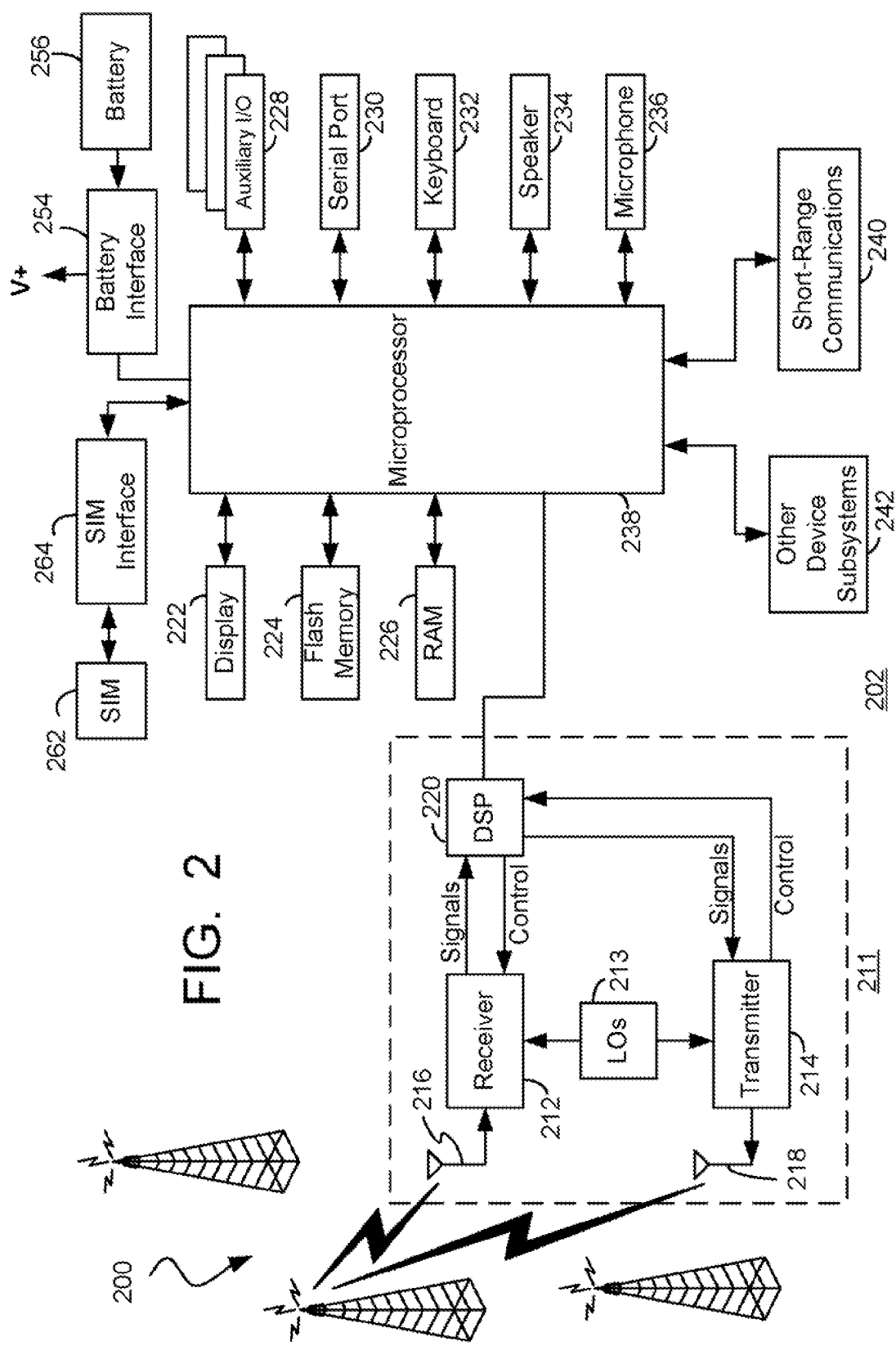
FIG. 2 is a more detailed diagram of a preferred mobile communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module (SIM) 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application which is loaded onto mobile station 202 may be a personal information manager (PIM) application having the ability to organize and manage data items relating to e-mail messages and voicemail messages, as well as calendar data. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238.

In a data communication mode, a received signal such as a text message (e.g. a short message service or SMS message), an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard or a telephone-type keypad or a combination thereof. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
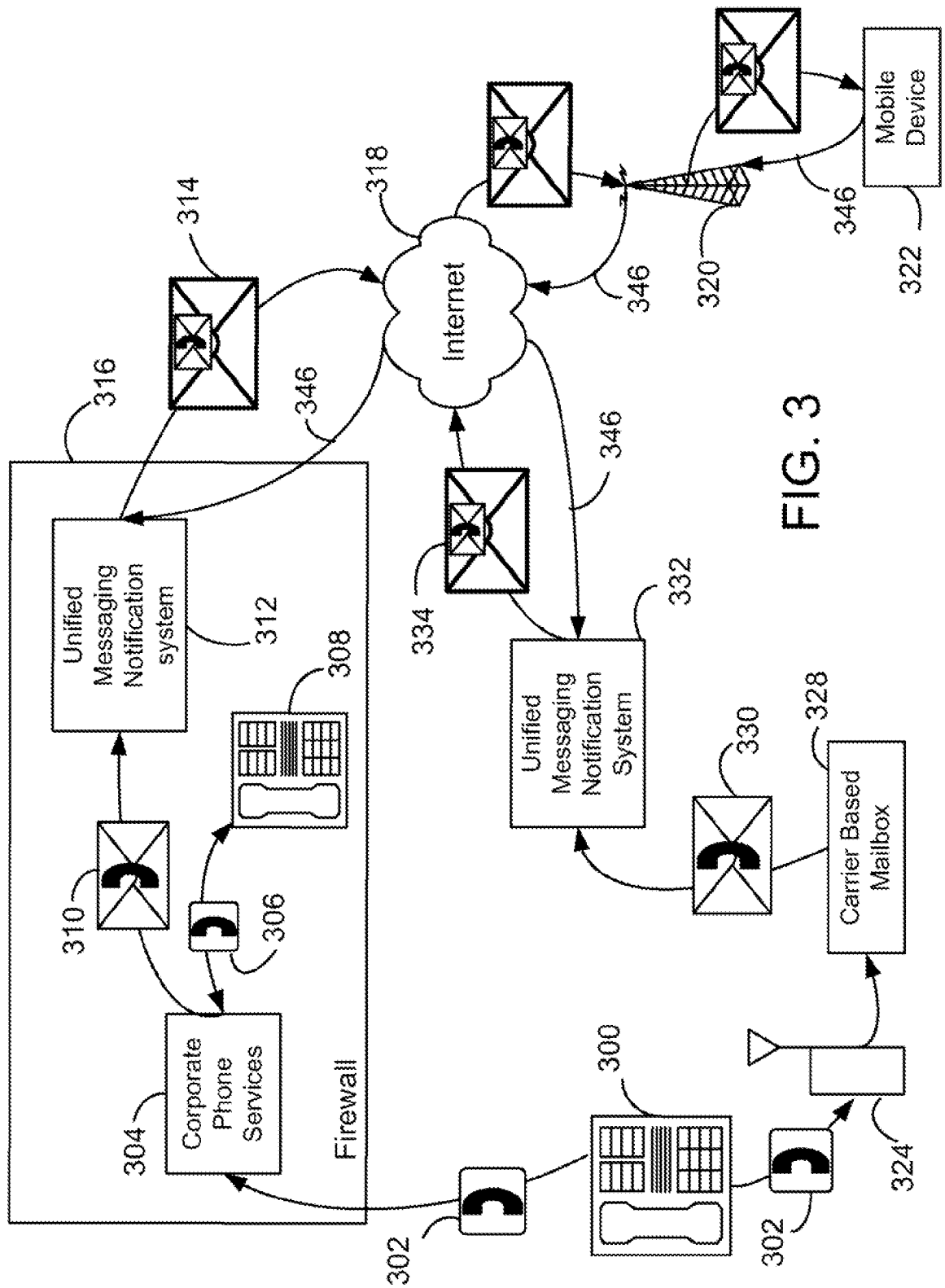
FIG. 3 is a diagram of communication network components which may be used in connection with the methods described herein.

FIG. 3 is a diagram of communication network components for use in describing general techniques utilized by the mobile station 322 for processing voicemail. An external source 300, such as a telephone or mobile phone, places a call 302. Call 302 may be routed to a corporate telephone 308 or to another service provider's mobile phone 324. When call 302 is intended for corporate telephone 308, call 302 is routed through a corporate phone service 304 and delivered 306 to corporate telephone 308 which is answered by the user. If the user is unable to answer corporate phone 308, however, the call is sent back 306 to corporate phone service 304 where the caller leaves a voicemail message 310. Voicemail message 310 is left at a unified messaging notification system 312 where it is stored. Without initiation from mobile device 322, system 312 immediately thereafter sends a voicemail notification message 314 via the Internet 318 and a wireless network 320 to the user's mobile device 322. Voicemail notification message 314 may be in the form of an e-mail message or a short message service (SMS) message. Based on voicemail summary information provided in voicemail notification message 314, voicemail message header information associated with voicemail message 310 is displayed in a visual display of mobile device 322. The header information may include, but is not limited to, calling party identification information, time stamp information, and time duration information.

When the user chooses to retrieve voicemail message 310, the user selects a visual object or switch associated with a "PLAY" function in connection with the header message. In response, mobile device 322 places a call 346 to unified messaging notification system 312 and sends one or more commands to play the voicemail message 310 at the mobile device 322. Preferably, voicemail notification message 314 includes not only the information used to provided the header information displayed in the visual display, but also voicemail message retrieval information used to access and process voicemail' message 310 from system 312. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 310 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 312 for executing the corresponding function at system 312 for processing voicemail message 310.

On the other hand, if call 302 is placed to a mobile phone 324 associated with the same end user, the call is sent to the mobile phone carrier's mailbox 328 where the caller leaves a voicemail message 330 if the user does not answer. The voicemail message 330 is sent to a unified messaging notification system 332 for the mobile phone's carrier where it is stored. Without initiation from mobile device 322, system 332 sends a voicemail notification message 334 via the Internet 318 and wireless network 320 to the user's mobile device 322. Voicemail notification message 334 may be in the form of an e-mail message or a short message service (SMS) message. Based on voicemail summary information provided in voicemail notification message 334, voicemail message header information associated with voicemail message 330 is displayed in a visual display of mobile device 322. The header information may include, but is not limited to, calling party identification information, time stamp information, and time duration information.

When the user chooses to retrieve voicemail message 330, the user selects a switch or visual object in the visual display associated with a "PLAY" function for this message. In response, mobile device 322 places a call 346 to the unified messaging system 332 and sends one or more commands to play the voicemail 330 at the mobile device 322. Preferably, voicemail notification message 334 includes not only the information used to provided the header information displayed in the visual display, but also voicemail message retrieval information used to access and process voicemail message 330 from system 332. This information may include, but is not limited to, a voicemail access telephone number, a message identification number, a voicemail system command to select and/or play the voicemail, and other voicemail system commands such as those relating to rewind, fast forward, skip back, skip forward, save, and delete, as examples. During or after voicemail message 330 is played, the user may select from a plurality of switches or visual objects in the display that are associated with "REWIND", "FAST FORWARD", "SKIP BACK", "SKIP FORWARD", "SAVE", or "DELETE", as examples. Mobile device 322 causes the stored voicemail system command corresponding to the user selected function to be sent to system 332 for executing the corresponding function at system 332 for processing voicemail message 330. As apparent from the above in FIG. 3, transparency of voicemail system-specific commands is provided in connection with use of several different voicemail systems.

Figure 4:
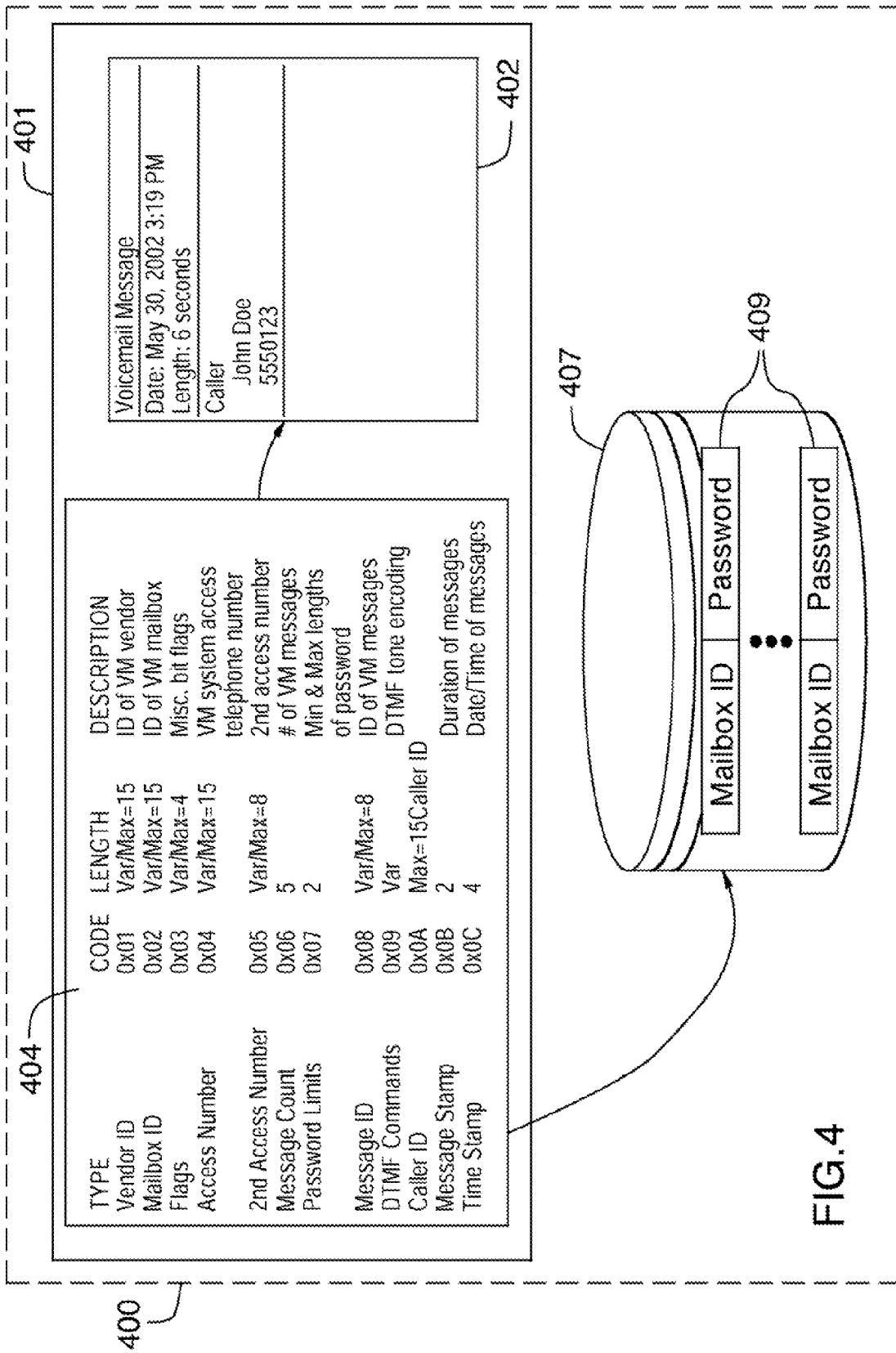
FIG. 4 is an example of voicemail and database information which may be used for that described in the present application.

FIG. 4 shows an example of voicemail processing data on a mobile device 400. A software application 401 on a mobile device 400 receives a voicemail notification message which carries a voicemail notification payload (VNP) 404. As initially received, VNP 404 includes information which is made visible to the user in mobile device's display 402. This information, which may be referred to as voicemail message summary information, may include information such as the length of the message, the calling party's identification, the caller's phone number, and the time and date of the voicemail. VNP 404 may also include information not made visible to the user but used by mobile device 400 to retrieve, play, and further process voicemail messages from a voicemail system. This information, which may be referred to as voicemail message retrieval information, may include information such as the identification of the voicemail vendor (Vendor ID), identification of the voice mailbox (Mailbox ID), the identification of the voicemail message number (Message ID), and the telephone number(s) that the device must call to access the voicemail system to retrieve voicemail messages (Access Number and Secondary Access Number). VNP 404 includes all the DTMF tone commands necessary for mobile device 400 to play and process voicemail messages for the particular voicemail system. VNP 404 also includes other information as shown, including bit flags to alert whether or not voice mailbox configuration is required (e.g. whether a password or audible user greeting is needed). Mobile device 400 utilizes a database 407 of user passwords 409 associated with each mailbox ID, which the device references when a given password 409 is required by the voicemail system for authentication.

Figure 5:
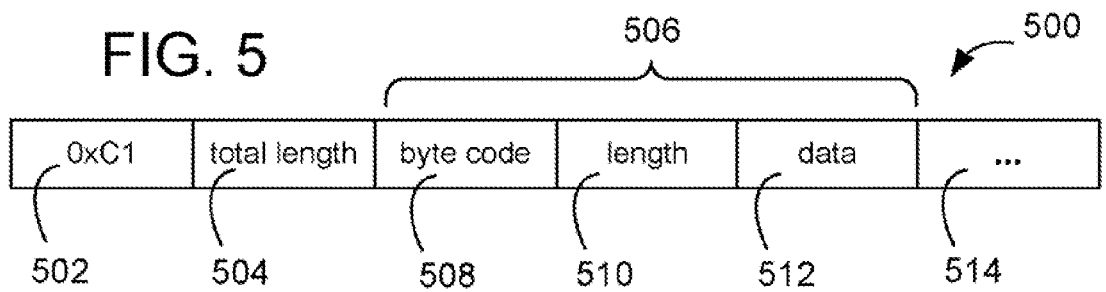
FIG. 5 is a message format which may be used for communication of voicemail notification messages having voicemail notification payloads (VNPs)

FIG. 5 is an example illustration of a message format 500 used to communicate a voicemail notification message having a voicemail notification payload (VNP). Message format 500 includes a byte string that specifies all relevant information about the voicemail message, including the voicemail message summary information and the voicemail message retrieval/processing information. Message format 500 may be provided in an e-mail message or, alternatively, in a short message service (SMS) message. If provided in an e-mail message, it may be located within an attachment of the e-mail message. If provided in an SMS message, it may be located in the body of the SMS message or, alternatively, in a data header of the SMS message. For the latter in particular, GSM 3.40 9.2.3.24 provides for available data header space which may used for such voicemail notification purpose.

The first byte in message format 500 is a voicemail notification message code 502 used to indicate that the message pertains to a voicemail notification. As shown in this example, the value "0xC1" is designated as voicemail notification message code 502 to indicate that the message is a voicemail notification message. The second byte in message format 500 specifies a total length 504 of the message, which may be a maximum of 140 bytes. After the total length information 504, what follows is a plurality of type-length encoded fields (such as a type-length encoded field 506) most pertinent to the VNP. Following type-length encoded field 506, additional type-length encoded fields 514 are preferably provided. Each type-length encoded field 506 includes a byte code field 508, a length field 510, and a voicemail-related data field 512. Each byte code field 508 includes data which describes the type of voicemail-related data which is inserted within voicemail-related data field 512. Each length field 510 describes the length (e.g. in bytes) of the voicemail-related data which is inserted within voicemail-related data field 512.

The following Table 1 outlines one example of information that may appear in the VNP, such as that which may be included in message format 500 of FIG. 5. Note that the information in Table 1 corresponds to that information described in the example of FIG. 4. This data is customizable with respect to the service provider.

TABLE 1

Another alternative of voicemail notification data that may appear in the VNP.

| TYPE | BYTE CODE | LENGTH | DESCRIPTION |
| --- | --- | --- | --- |
| VENDOR_ID | 0x01 | Variable, Max 15 | Identifier representing the vendor which supplied the voicemail notification. (ASCII) |

TABLE 1-continued

Another alternative of voicemail notification data that may appear in the VNP.

| TYPE | BYTE CODE | LENGTH | DESCRIPTION |
| --- | --- | --- | --- |
| MAILBOX_ID | 0x02 | Variable, Max 15 | A unique ID of the voice mailbox containing the voicemail message. It may be a string representing the voice mailbox. (ASCII) |
| FLAGS | 0x03 | Variable, Max 4 | Misc. bit flags. E.g., whether a password is required for authentication. (binary) |
| ACCESS_NUMBER | 0x04 | Variable, Max 15 | The voicemail access number that is to be called in order to play the message. (ASCII) |
| SECONDARY_ACCESS_NUMBER | 0x05 | Variable, Max 8 | The number which may need to be dialed upon connection to a PBX, in order to transfer the call to the voicemail system. (ASCII) |
| MESSAGE_COUNTS | 0x06 | 5 | Number of new, urgent, fax, and total messages, and max messages in mailbox. (binary) |
| PASSWORD_LIMITS | 0x07 | 2 | Min and Max password lengths. Defaults: min 4, max 7. (binary) |
| MESSAGE_ID | 0x08 | Variable, Max 8 | Unique ID of the message within the voice mailbox. BCD with 0xF filler bit if the number of digits is odd. |
| DTMF_CMDS | 0x09 | Variable length | Encoding of DTMF access control tones. Defaults defined in Appendix A. |
| CALLER_ID | 0x0A | Max 15 | The caller ID (phone number) of the caller who left the voicemail message, if available. (ASCII) |
| MESSAGE_LENGTH | 0x0B | 2 | The length in seconds of the voicemail message. |
| TIMESTAMP | 0x0C | 4 | The date/time at which the message was left. (binary, specified as the number of seconds since Jan. 1, 1970 00:00) |
| DELETE_LIST | 0x0E | Variable | The list of messages that were deleted during the last subscriber session. Lists the size of a MSG_ID followed by list Of MESSAGE ID's. E.g., 00178, 00179 delete confirmations would have format 0x3, 0x00, 0x17, 0x8f, 0x00, 0x17, 0x9f |
| ACK_LIST | 0x0F | Variable | The list of messages acknowledged by the mobile during the last subscriber session. Lists the size of a MESSAGE_ID followed by a list of message ID's. E.g. 00178, 00179 would have the format 0x03 |

In Table 1, VENDOR_ID is a unique string representing the vendor which provided the voicemail notification. MAILBOX_ID represents the unique ID of the voice mailbox that contains the voicemail message. FLAGS are bit flags specifying various configuration options as well as characteristics of the voicemail message or the mailbox itself (e.g. whether the message is urgent, whether the user's mailbox is full, or whether a password is required for authentication once the call into the voicemail system is connected).

ACCESS_NUMBER is the phone number to be called in order to connect with the voicemail system and play the voicemail message. SECONDARY_ACCESS_NUMBER, which is optional, is a number to be dialed by the mobile device upon connection to the number specified in the ACCESS_NUMBER field. Dialing the secondary access number will transfer the call to the voicemail system. To connect to a corporate voicemail system; for example, the user is typically required to call a main phone number to connect to the corporate PBX, and subsequently dial an extension which transfers the call to the voicemail system.

MESSAGE_COUNTS is the number of new, urgent, and fax messages in the user's mailbox, as well as the number of messages in the mailbox and the maximum number of messages in the mailbox. PASSWORD_LIMITS is the minimum and maximum length of the voice mailbox password. There should be two bytes following the length byte. The first byte represents the minimum password length and second byte represents the maximum password length.

MESSAGE_ID is the unique ID of the message within the voice mailbox identified by MAILBOX_ID. CALLER_ID is the phone number of the caller who left the voicemail message. The number is preferably fully qualified, including country code, area/city code, and phone number. MESSAGE_LENGTH is the length in seconds of the voicemail message. TIMESTAMP is the time at which the voicemail message was deposited in the voice mailbox, specified as the number of seconds since midnight the Jan. 1, 1970 UTC.

DELETE_LIST is a list of message IDs that have been deleted by way of a DELETE command. This field is preferably in the format [TYPE][LENGTH][MSGID LENGTH] [ID1][ID2] . . . [IDN]. ID1 . . . IDN is preferably nibble-packed BCD with an "F" filler bit if the number of digits in the message IDs is odd. The byte MSGID LENGTH byte indicates the number of bytes needed to represent the message ID, not the number of digits in the message ID. ACK_LIST is a list of messages that have been acknowledged by the device via the ACK command. This field is to be encoded in the same manner as the DELETE_LIST field.

DTMF_CMDS is a string of bytes specifying the DTMF sequences required for each supported access control command. The DTMF commands are specified in two-byte pairs, such that the first byte indicates the access control command, and the second byte is a BCD-encoding of the two-digit DTMF sequence required to invoke the command. See Table 2 below for one example of DTMF access control commands.

TABLE 2

One example of DTMF access control command definitions.

| COMMAND | BYTE CODE | DEFAULT VALUE |
|---|---|---|
| SET_MSG_ID | 0x01 | 0x11 |
| PLAY | 0x02 | 0x12 |
| PAUSE_PLAYBACK | 0x03 | 0x13 |
| RESUME_PLAYBACK | 0x04 | 0x14 |
| SKIP_FWD | 0x05 | 0x15 |
| SKIP_BACK | 0x06 | 0x16 |

TABLE 2-continued

One example of DTMF access control command definitions.

| COMMAND | BYTE CODE | DEFAULT VALUE |
|---|---|---|
| DELETE_MSG | 0x20 | 0x21 |
| FORWARD_MSG | 0x23 | 0x22 |
| REPLY_TO_MSG | 0x24 | 0x23 |
| ACK_MSG_IDS | 0x30 | 0x24 |
| DELETE_MSG_IDS | 0x31 | 0x25 |
| PLAY_GREETING | 0x40 | 0x41 |
| DELETE_GREETING | 0x41 | 0x42 |
| RECORD_GREETING | 0x42 | 0x43 |
| SET_PASSWORD | 0x43 | 0x44 |
| SET_GREETING | 0x44 | 0x45 |
| RECORD_NAME | 0x45 | 0x46 |
| DELETE_NAME | 0x46 | 0x47 |
| PLAY_NAME | 0x47 | 0x48 |

Figure 6:
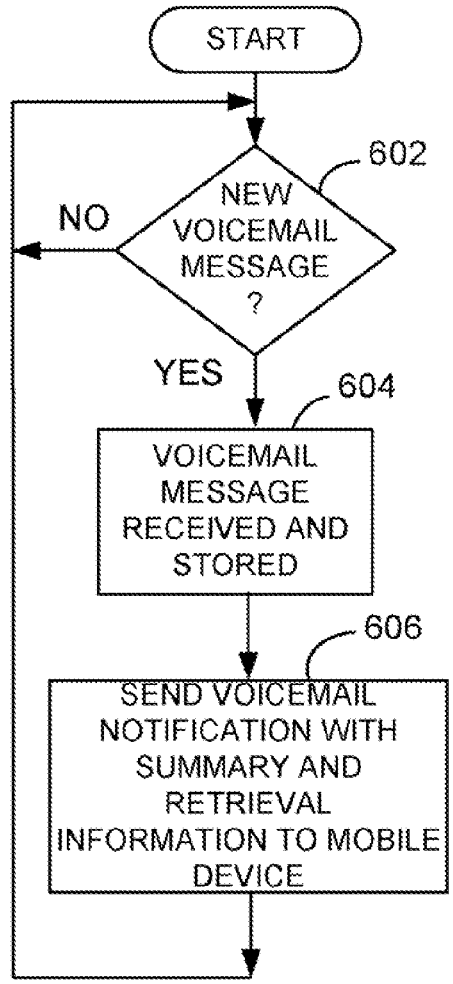
FIG. 6 is a flowchart of a general method of sending voicemail notification information from a voicemail system to a mobile communication device.
Figure 7:
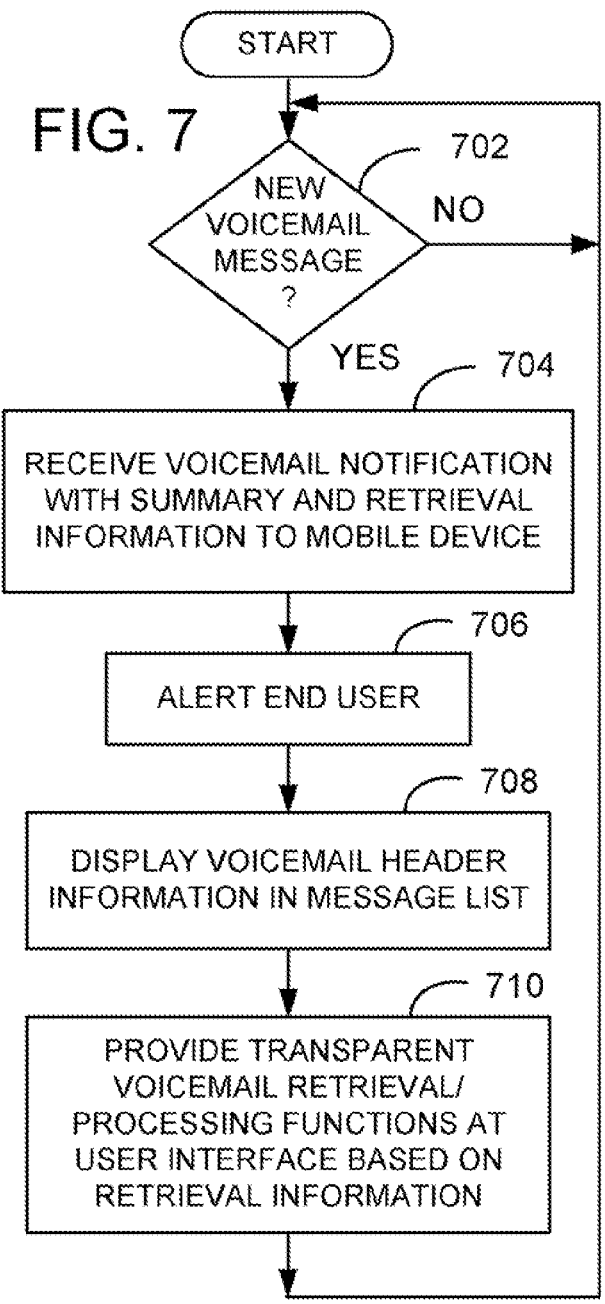
FIG. 7 is a flowchart of a general method of receiving and processing voicemail notification information by a mobile communication device.

FIGS. 6 and 7 are basic flowcharts describing communication and processing of the voicemail notification data described in relation to FIGS. 4-5. FIG. 6 describes basic communication from the system to the mobile device, and FIG. 7 describes the basic reception and processing of such information at the mobile device. Beginning at a start block in FIG. 6, if a voicemail message is incoming as tested at step 602, then it will be received and stored at the voicemail system in a particular user's voice mailbox (step 604). In response, a voicemail notification message will be sent to a mobile device associated with the voice mailbox (step 606). The voicemail notification message includes voicemail message summary information and voicemail retrieval/processing information as described above.

Beginning at a start block in FIG. 7, if a voicemail message is stored in the voicemail system at step 702, then a voicemail notification message will be received at the mobile device shortly thereafter (step 704). This voicemail notification message includes voicemail message summary information and voicemail retrieval/processing information as described above, which is stored in the mobile device. The mobile device alerts the end user through its user interface (step 706). Using the voicemail message summary information, the notification is preferably displayed in the form of a message header line in the visual display of the mobile device (step 708). Using the voicemail processing information, the mobile devices provides transparent voicemail retrieval and processing functions at the user interface (step 710). To do this, the mobile device is preferably provided with a graphical user interface (GUI) having visual objects associated with basic voicemail functions such as PLAY, REWIND, FAST FORWARD, SKIP BACK, SKIP FORWARD, SAVE, and DELETE. Additional voicemail notifications may be subsequently received and handled similarly. The end user needs not remember voicemail system specific commands for each voicemail system and therefore voicemail processing is made much easier. A common user interface is utilized for each different voicemail system in which voicemail messages are kept.

FIGS. 8-22 are illustrations of a visual display of a graphical user interface (GUI) of a mobile device used for configuring a voice mailbox of a remote voicemail system. The mobile device 102 or 202 of FIG. 1 or 2 may utilize these techniques. In the following description, a controller/processor of the mobile device causes user input prompts to be visually displayed as shown and described, receives voicemail information from the user interface, and causes a wireless transmitter to transmit appropriate information to the voicemail system as necessary. Advantageously, visual user input prompts corresponding to conventional audible user input prompts from the voicemail system are provided in the GUI for voice mailbox configuration. The GUI utilized for voice mailbox configuration is similar to that utilized for the primary applications of the mobile device (e.g. Internet or e-mail applications).

Figure 8:
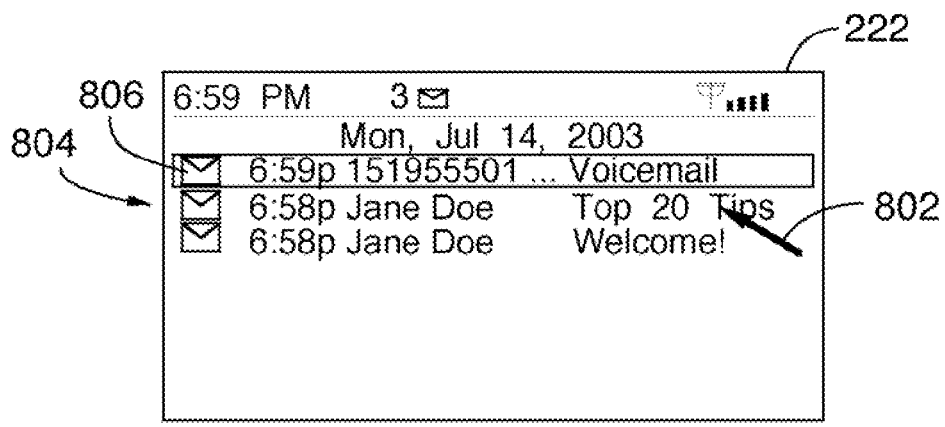
FIGS. 8-22 are illustrations of a visual display of a graphical user interface (GUI) of the mobile device for configuring voice mailbox configuration information for a voice mailbox of a voicemail system.

Beginning with FIG. 8, an example of a message list 804 displayed in visual display 222 of the mobile device is shown. Visual display 222 is a part of the GUI of the mobile device, as are buttons or keyboard 232 (FIG. 2) and optionally a mouse, thumbwheel or similar device for moving a cursor 802 for actuating visual objects in the GUI. In a variation of this GUI, at least some mechanical switches associated with function indicators (e.g. "OK", "ENTER", "→", or "←", etc.) may be utilized with or without displaying visual objects in the visual display. As shown, message list 804 includes a plurality of message header lines which correspond to an e-mail message or a voicemail message. A message header line 806 in the list 804 corresponds to a voicemail message. Any voicemail message header line will show message summary information from the voicemail notification payload (VNP) (e.g. a message time stamp and caller identification). Visual display 222 also displays an indication of the number of new messages received at the mobile device. Although three message header lines are shown in FIG. 8, any number of message header lines may be simultaneously displayed.

Figure 9:
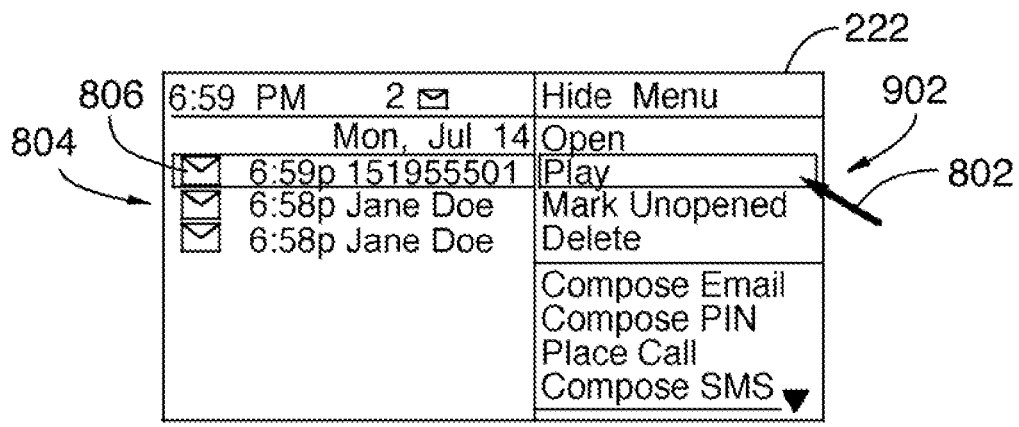

In FIG. 9 it is shown that voicemail message header line 806 from FIG. 8 is selected from message list 804 by the user. When a voicemail message header line is selected, a pull-down menu 902 of functions from which the user may select is displayed on visual display 222. As shown, the possible functions listed in menu 902 include OPEN, PLAY, MARK OPENED, DELETE, COMPOSE E-MAIL, COMPOSE PIN, PLACE CALL, COMPOSE SMS, etc. The default option in menu 902 is a PLAY function (highlighted in FIG. 9) for playing a voicemail message associated with the message header line. When the PLAY function is selected, the mobile device typically "automatically" calls the appropriate voicemail telephone access number listed in the VNP and subsequently sends the appropriate DTMF tone command(s) from the VNP to play the selected voicemail message.

Figure 10:
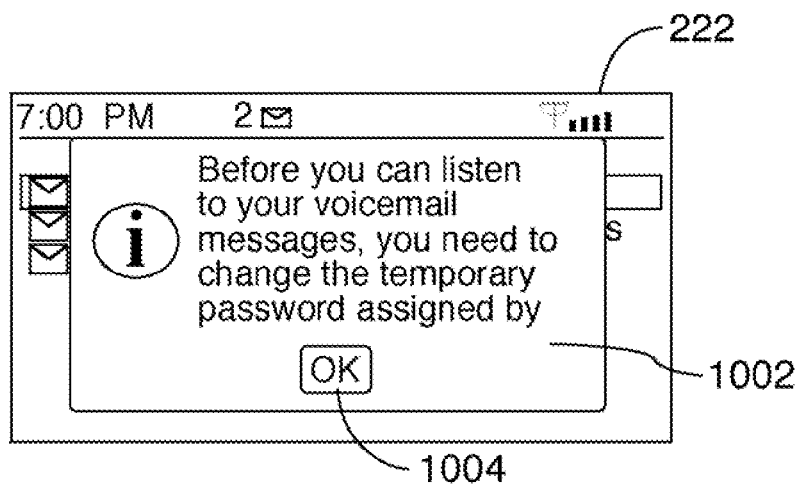

In this particular instance, however, initial voicemail configuration information is needed for the voice mailbox at the voicemail system. Voicemail configuration information typically includes a user password, an audible user greeting, and an audible user name. The mobile device is made aware of the configuration requirement based on a bit flag in the VNP (see Table 1 above) and thus operates differently from typical operation. In this situation and as shown in FIG. 10, the mobile device displays a user input prompt 1002 which instructs the user that the user password for the voice mailbox needs to be changed. A visual object 1004 ("OK") which allows the user to confirm this instruction is displayed and its actuation causes the mobile device to display that which is shown in FIG. 11.

Figure 11:
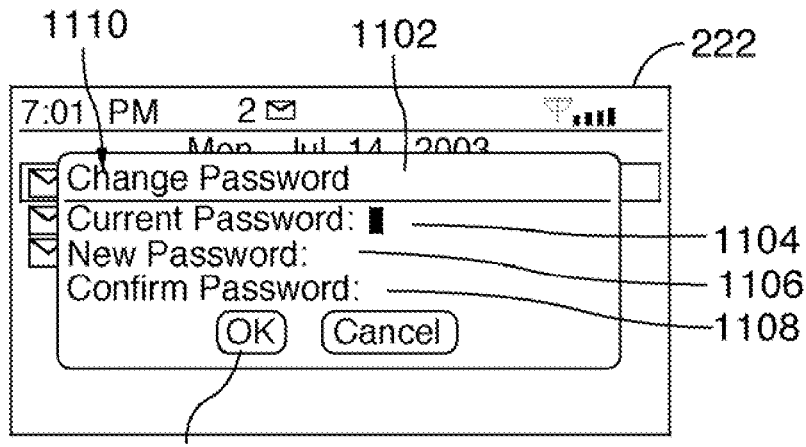
Figure 12:
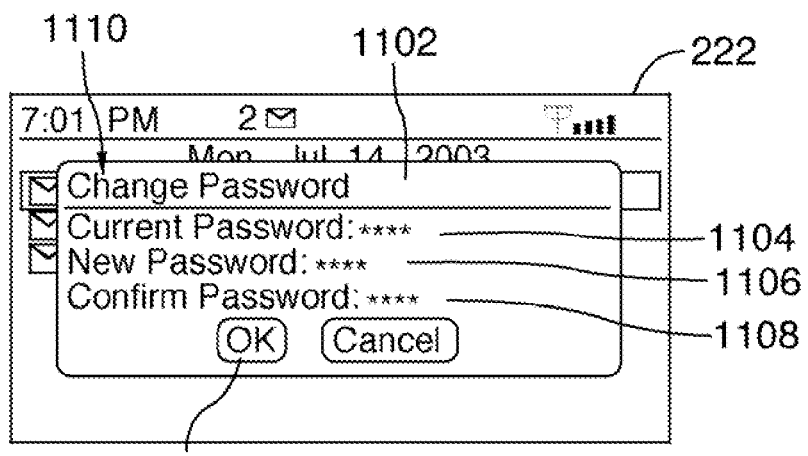

In FIG. 11, the mobile device displays a user input prompt 1102 for user password information in its display 222. User input prompt 1102 includes a plurality of text prompts and user input data fields 1110 for the user password information. Specifically, a text prompt and data field 1104 is used for accepting user input for a current password ("Current Password"); a text prompt and data field 1106 is used for accepting user input for a new or changed password ("New Password"); and a text prompt and data field 1108 is used for accepting user input for the new or changed password again ("Confirm Password"). FIG. 11 shows these data fields 1110 empty (i.e. prior to being filled with user data), whereas FIG. 12 shows these data fields 1110 populated with user data. Note that, at this point, the mobile device has not initiated a connection with the voicemail system.

Figure 13:
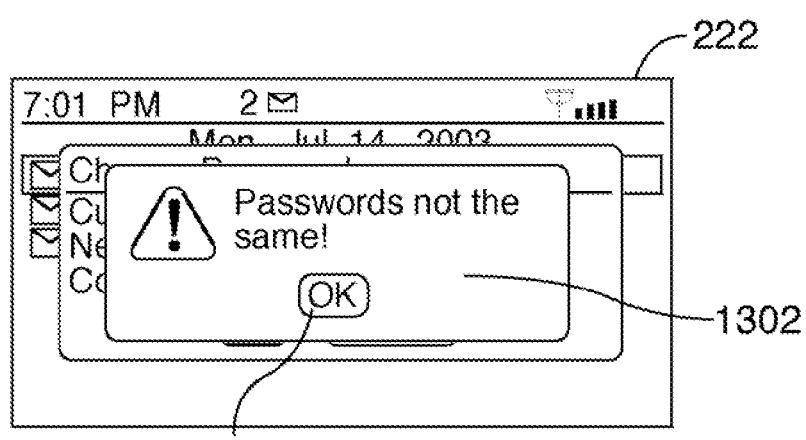

An actuation of a visual object 1104 ("OK") confirms the entry of this user password information in FIG. 12, whereas an actuation of another visual object ("Cancel") for canceling the process terminates the process. In response to an actuation of visual object 1104 by the user, the mobile station compares the new password and the confirmation password. If there is a difference between the new password and the confirmation password, then the mobile station displays a user input prompt 1302 which indicates that the passwords are not the same and a visual object 1304 ("OK") for user confirmation as shown in FIG. 13. When the user actuates visual object 1304, the mobile station will again display that which is shown in FIG. 11 and repeat the process.

Figure 14:
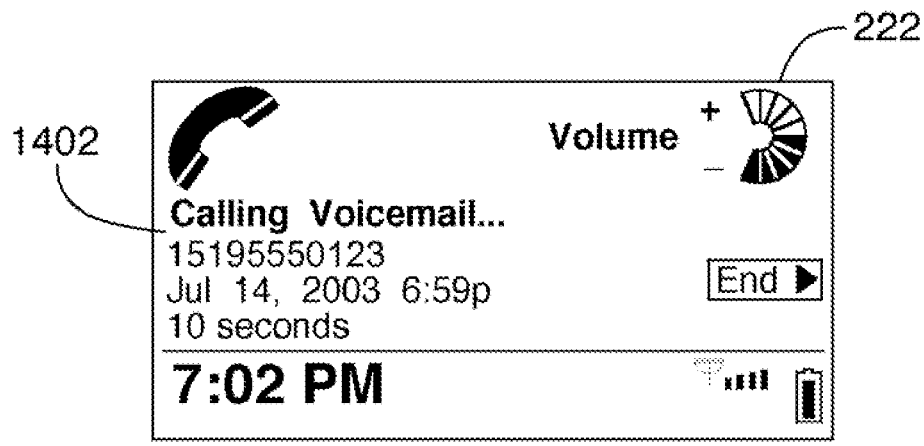

If there is a match between the new password and the confirmation password entered in FIG. 12, the mobile device "automatically" initiates a connection to the voicemail system by causing the telephone number of the voicemail system to be dialed. While doing this, the mobile station causes display 222 to display a calling status 1402 ("Calling Voicemail") as shown in FIG. 14. Subsequently, a connection is established between the mobile device and the voicemail system. When connected to the voicemail system, the mobile station causes display 222 to display a connected status ("Connected to Voicemail") (not shown) and causes the appropriate DTMF command(s) (identified from the VNP) corresponding to storing the user password information to be sent to the voicemail system.

Figure 15:
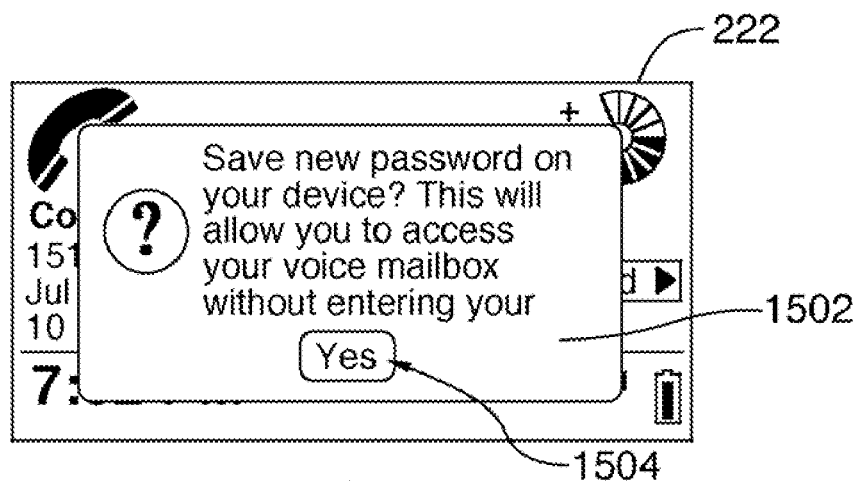

Once connected to the voicemail system, the mobile station displays a user input prompt 1502 in FIG. 15 suggesting that the previously input user password information be stored in memory of the mobile device. An actuation of a visual object 1504 ("Yes") by the user causes the user password information to be stored in the mobile device's memory. In subsequent voice mailbox access with the mobile device, the mobile device will "automatically" submit this stored password information to the voicemail system for authentication.

Figure 16:
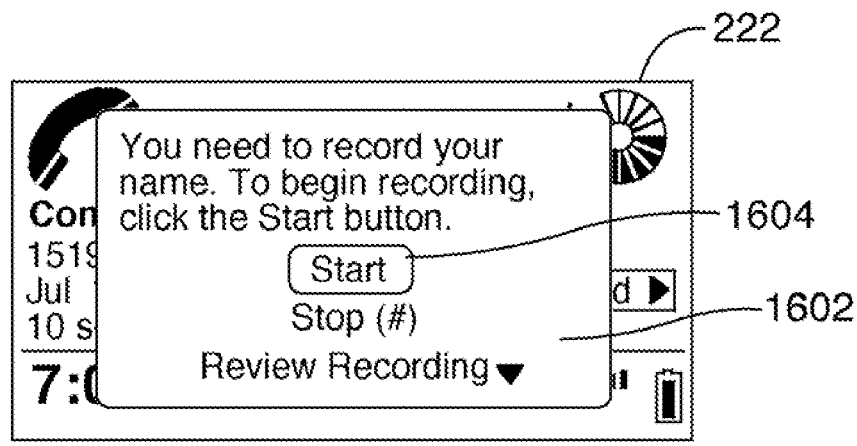

After actuation of visual object 1504 and storage of the user password information, the mobile device displays a user input prompt 1602 to initiate the recording of an audible user name as shown in FIG. 16. An actuation of a visual object 1604 ("Start") by the user will begin the recording of the audible user name. More particularly, the actuation of visual object 1604 causes the appropriate DTMF command(s) (identified from the VNP) corresponding to recording a user name to be sent to the voicemail system. The user speaks into a microphone of the mobile device (e.g. microphone 236 of FIG. 2) to record the user name. The user may actuate a visual object for ending the recording ("STOP") or, alternatively, the voicemail system may terminate the recording after the detection of no audio or the expiration of a predetermined time period.

Figure 17:
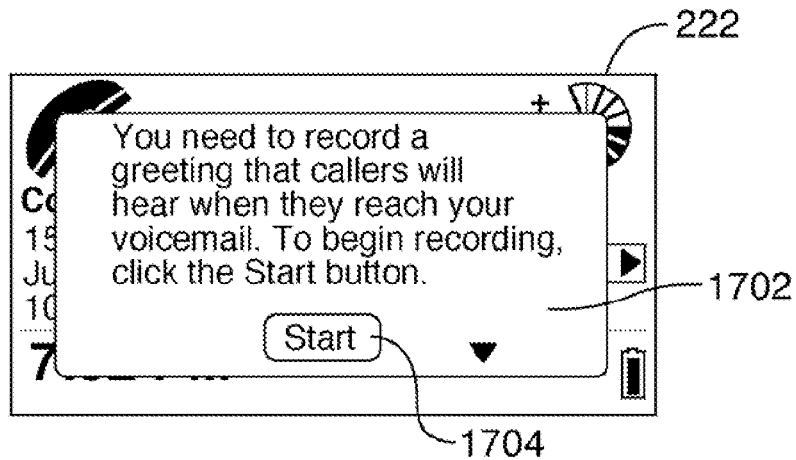

After storage of the audible user name, the mobile device displays a user input prompt 1702 to initiate the recording of an audible user greeting as shown in FIG. 17. An actuation of a visual object 1704 ("Start") by the user will begin the recording of the audible greeting. More particularly, the actuation of visual object 1704 causes the appropriate DTMF command(s) (identified from the VNP) corresponding to recording a user greeting to be sent to the voicemail system. The user speaks into a microphone of the mobile device (e.g. microphone 236 of FIG. 2) to record the user greeting. The user may actuate a visual object for ending the recording ("STOP") or, alternatively, the voicemail system may terminate the recording after the detection of no audio or the expiration of a predetermined time period.

Figure 18:
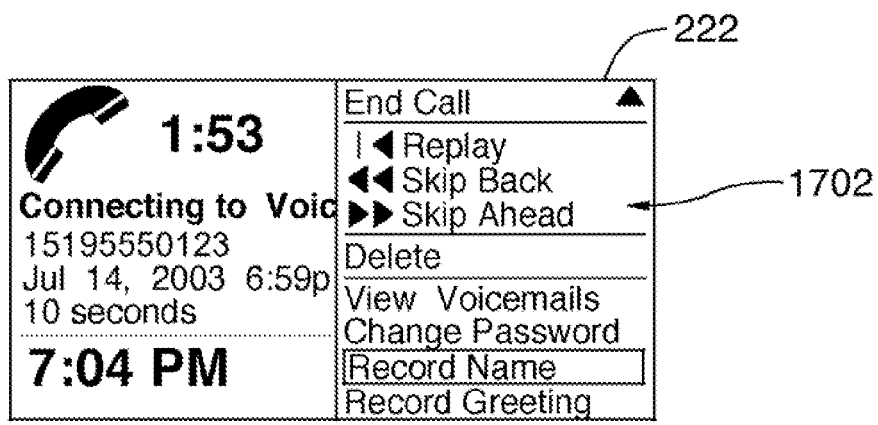

After completing all of the steps described in relation to FIGS. 8-17, the user has completed the configuration of the voice mailbox for the voicemail system. The mobile device continues to display its connected status to the voicemail system. While being connected with the voicemail system, whether at this time or during a subsequent connection, the user may listen to and process voicemail messages and/or also change the voice mailbox configuration information. As shown in FIG. 18, the mobile station provides a pull-down menu 1802 of visual text objects corresponding to different voicemail functions such as "View Voicemails", "Change Password", "Record Name", and "Record Greeting", as shown in FIG. 18. Other functions which may be utilized while listening to a particular voicemail message include "Replay", "Skip Back", "Skip Forward", and "Delete" in pull-down menu 1802. An actuation of "End Call" in pull-down menu 1802 will cause the mobile station to initiate a disconnection of the call with the voicemail system.

Figure 19:
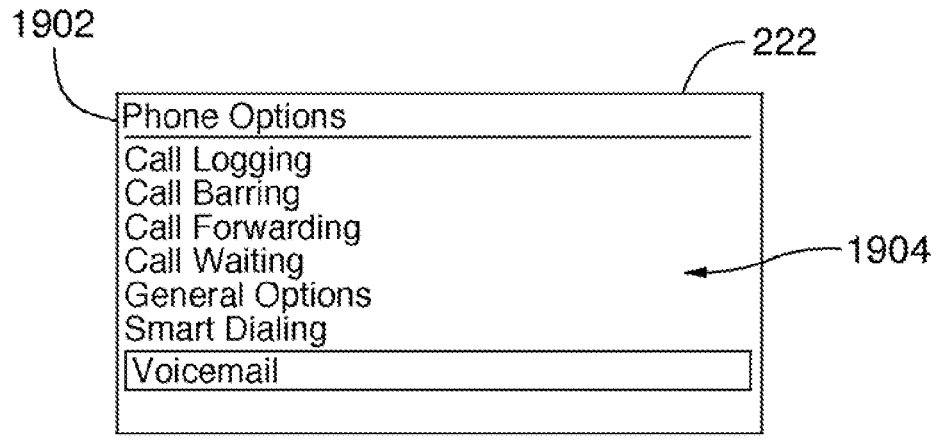
Figure 20:
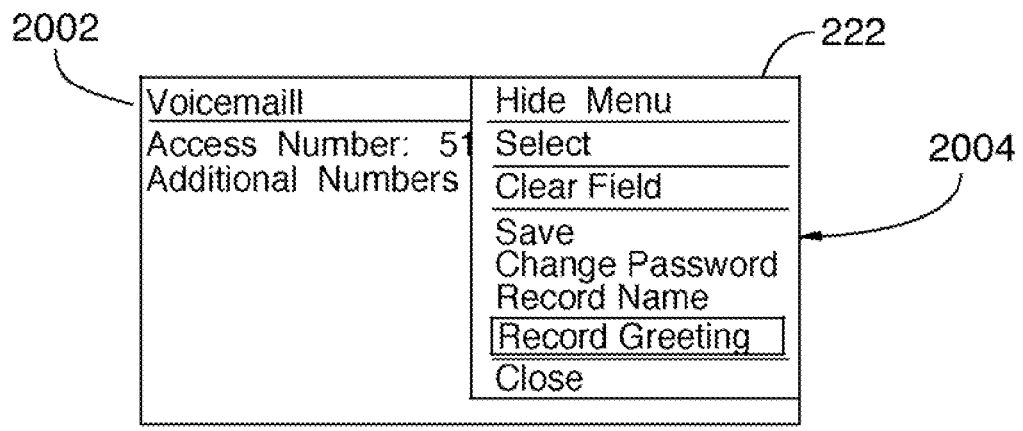

Even when not connected to the voicemail system, the mobile station provides a plurality of phone options 1902 in a pull-down menu 1904 as shown in FIG. 19. One of the phone options 1902 in pull-down menu 1904 is "Voicemail". Other options listed in menu 1904 include "Call Logging", "Call Barring", "Call Forwarding", "Call Waiting", "General Options", and "Smart Dialing". If the "Voicemail" option is selected from pull-down menu 1904, then voicemail system information 2002 is displayed as shown in FIG. 20. Voicemail system information 2002 may include information such as a voicemail access telephone number(s) for the voicemail system, which may be changed by the user in the GUI. Also as shown, the mobile device provides a pull-down menu 2004 which may include other related options such as "Change Password", "Record Name", and "Record Greeting".

Figure 21:
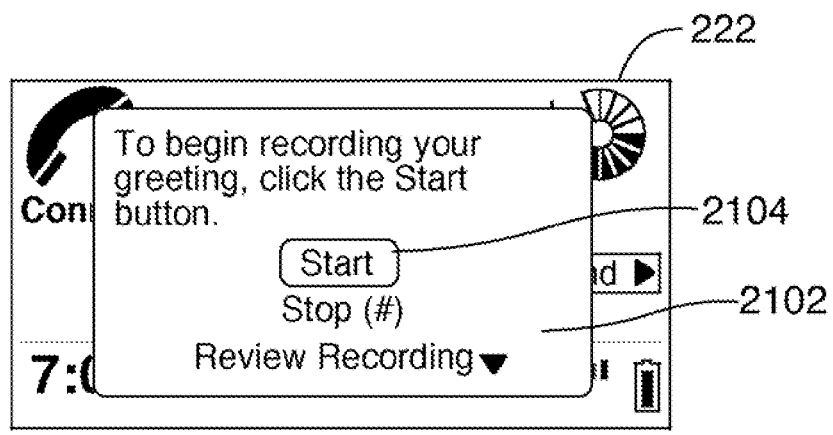

If "Record Greeting" in menu 2004 is actuated, for example, the mobile device displays a user input prompt 2104 in FIG. 21 to initiate the recording of the audible user greeting. An actuation of a visual object 2104 ("Start") by the user will begin the recording of the audible greeting. More particularly, the actuation of visual object 2104 causes the appropriate DTMF command(s) (identified from the VNP) corresponding to recording a user greeting to be sent to the voicemail system. The user speaks into a microphone of the mobile device (e.g. microphone 236 of FIG. 2) to record the user greeting. The user may actuate a visual object for ending the recording ("STOP") or, alternatively, the voicemail system may terminate the recording after the detection of no audio or the expiration of a predetermined time period. This technique for recording the user greeting is the same as that described in relation to FIG. 17.

Figure 22:
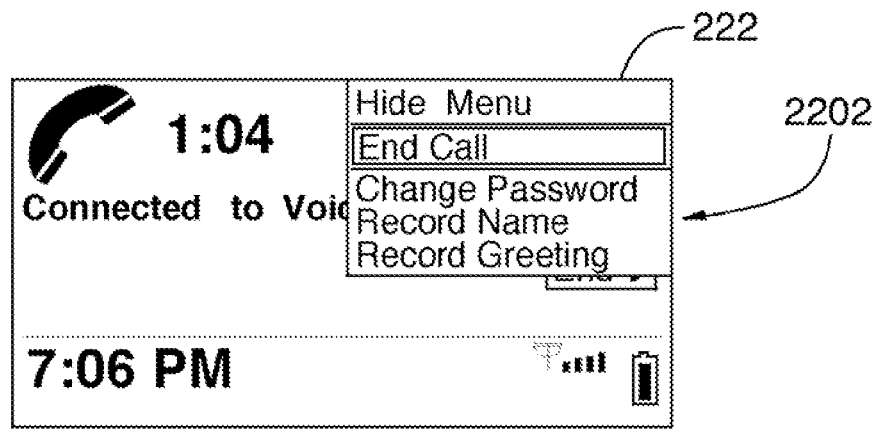

After recording the user greeting, the mobile device continues to display its connected status to the voicemail system as shown in FIG. 22. A pull-down menu 2202 in display 222 includes options such as "Hide Menu", "End Call", "Change Password", "Record Name", and "Record Greeting". An actuation of the "End Call" option will cause the mobile station to initiate a disconnection of the call with the voicemail system.

Note that the visual user input prompts described in relation to FIGS. 8-22 correspond to audible user input prompts from the voicemail system. The mobile device may allow these audible user input prompts from the voicemail system to be heard by the user through the speaker while the corresponding visual prompts are being displayed. Alternatively, only the visual prompts are provided and the speaker is muted so that the audible user input prompts cannot be heard. In any case, the mobile device provides a consistent user-friendly GUI for voice mailbox configuration as well as for its primary applications.

Voice mailbox configuration methods and apparatus for mobile communication devices have been described. In a mobile communication device, a method of facilitating the communication of voice mailbox configuration information to a remote voicemail system includes the steps of providing a user interface in the mobile device which includes a graphical user interface (GUI); causing a user input prompt for voice mailbox configuration information to be visually displayed in a display of the GUI which corresponds to an audible user input prompt from a voicemail system; receiving, through the user interface, voice mailbox configuration information which is responsive to the user input prompt; and causing the voice mailbox configuration information to be transmitted through a wireless transmitter to the voicemail system for storage.

A mobile communication device of the present application includes a user interface which includes a graphical user interface (GUI); a visual display of the GUI which displays a user input prompt for voice mailbox configuration information corresponding to an audible user input prompt from a voicemail system; a processor which receives, through the user interface, voice mailbox configuration information which is responsive to the user input prompt; and a wireless transmitter which transmits the voice mailbox configuration information to the voicemail system for storage.

A computer program product of the present application includes a data storage medium and computer instructions stored on the data storage medium. The data storage medium may be any memory in mobile station 202 or even a floppy disk or CD-ROM, as examples; detailed computer instructions are written in accordance with the methods and logic described in the present application. The computer instructions on the data storage medium are executable by a processor for causing a user input prompt for voice mailbox configuration information to be visually displayed in a display of a mobile communication device which corresponds to an audible user input prompt from a voicemail system; receiving voice mailbox configuration information through the user interface which is responsive to the user input prompt; and causing the voice mailbox configuration information to be transmitted through a wireless transmitter to the voicemail system for storage.

Another method of the present application includes the steps of visually, displaying, through a graphical user interface (GUI) of the mobile device, a user input prompt for user password information associated with a voice mailbox of a voicemail system; receiving the user password information through the GUI; and causing the user password information to be transmitted through a wireless transmitter to the voicemail system for storage. Even another method includes the steps of visually displaying, in a graphical user interface (GUI) the mobile device, a user input prompt to record an audible voicemail greeting for a voice mailbox of a voicemail system; receiving, through a microphone, the audible voicemail greeting in response to the user input prompt; and causing the audible voicemail greeting to be transmitted through a wireless transmitter to the voicemail system for storage.

The above-described embodiments of the present application are intended to be examples only. Those of skill in the art may effect alterations, modifications and variations to the particular embodiments without departing from the scope of the application. For example, instead of using a GUI at the mobile device for processing voicemail messages, mechanical switches associated with function indicators (e.g. "OK", "ENTER", "→", or "←", etc.) may be utilized with or without displaying visual objects in the visual display. The invention described herein in the recited claims intend to cover and embrace all suitable changes in technology.

What is claimed is:

1. A method for use in a cellular telephone for configuring voice mailbox configuration information at a remote voicemail system for storage in association with a voice mailbox of the cellular telephone, the cellular telephone being further configured to access voicemail from the voice mailbox at the remote voicemail system via a cellular network, the cellular telephone including a memory and a user interface having a display which provides a graphical user interface of the cellular telephone, the method comprising:

visually displaying, in the graphical user interface, a user input prompt for initializing or changing, at the remote voicemail system, the voice mailbox configuration information;

in response to visually displaying the user input prompt, receiving the voice mailbox configuration information that is input via the graphical user interface and storing the voice mailbox configuration information in the memory;

after receiving and storing the voice mailbox configuration information in the memory, initiating a connection with the remote voicemail system via the cellular network; and causing the stored voice mailbox configuration information and a command for setting the voice mailbox configuration information to be transmitted, via the cellular network, over the connection to the remote voicemail system, for configuring the voice mailbox with the voice mailbox configuration information transmitted from the cellular telephone, the voice mailbox configuration information being utilized by the remote voicemail system upon cellular telephone access to the voice mailbox.

2. The method of claim 1, further comprising:
providing the graphical user interface with voicemail retrieval and processing functions for end user retrieval and processing of voicemail messages in the voice mailbox.

3. The method of claim 1, wherein the user input prompt corresponds to an audible user input prompt communicated from the remote voicemail system.

4. The method of claim 1, wherein the acts of visually displaying and receiving occurs while no connection is maintained between the cellular telephone and the remote voicemail system via the cellular network.

5. The method of claim 1, wherein the user input prompt comprises a user input instruction.

6. The method of claim 1, wherein the user input prompt comprises a user input data field.

7. The method of claim 1, wherein the user input prompt comprises a visual object for invoking the command at the remote voicemail system.

8. The method of claim 1, wherein the voice mailbox configuration information comprises a user password for the voice mailbox.

9. The method of claim 1, wherein the voice mailbox configuration information comprises one of an audible voicemail greeting and an audible voicemail user name for the voice mailbox.

10. The method of claim 1, which is embodied in a computer readable medium as computer instructions which are executable by one or more processors of the cellular telephone.

11. A cellular telephone operative to configure voice mailbox configuration information at a remote voicemail system for storage in association with a voice mailbox of the cellular telephone, and further operative to access voicemail from the voice mailbox at the remote voicemail system via a cellular network, the cellular telephone comprising:

a processor;
memory coupled to the processor;
a wireless transceiver coupled to the processor, the wireless transceiver operative for communications via the cellular network;
a user interface having a display which provides a graphical user interface of the cellular telephone;
the processor being operative to:
cause a user input prompt to be visually displayed in the graphical user interface, the user input prompt being for initializing or changing, at the remote voicemail system, the voice mailbox configuration information;
in response to visually displaying the user input prompt, receive the voice mailbox configuration information that is input via the graphical user interface and store the voice mailbox configuration information in the memory;
after receiving and storing the voice mailbox configuration information in the memory, initiate a connection with the remote voicemail system via the cellular network; and
cause the stored voice mailbox configuration information and a command for setting the voice mailbox configuration information to be transmitted, via the cellular network, over the connection to the remote voicemail system, for configuring the voice mailbox with the voice mailbox configuration information, the voice mailbox configuration information being for use by the remote voicemail system upon cellular telephone access to the voice mailbox.

12. The cellular telephone of claim 11, wherein the processor is further operative to provide the graphical user interface with voicemail retrieval and processing functions for end user retrieval and processing of voicemail messages in the voice mailbox.

13. The cellular telephone of claim 11, wherein the user input prompt corresponds to an audible user input prompt communicated from the remote voicemail system.

14. The cellular telephone of claim 11, wherein the acts of visually displaying and receiving occurs while no connection is maintained between the cellular telephone and the remote voicemail system via the cellular network.

15. The cellular telephone of claim 11, wherein the user input prompt comprises a user input instruction.

16. The cellular telephone of claim 11, wherein the user input prompt comprises a user input data field.

17. The cellular telephone of claim 11, wherein the user input prompt comprises a visual object for invoking the command at the remote voicemail system.

18. The cellular telephone of claim 11, wherein the voice mailbox configuration information comprises a user password for the voice mailbox.

19. The cellular telephone of claim 11, wherein the voice mailbox configuration information comprises an audible voicemail greeting for the voice mailbox.

20. The cellular telephone of claim 11, wherein the voice mailbox configuration information comprises an audible voicemail user name for the voice mailbox.

* * * * *